United States Patent [19]

Moriyama

[11] Patent Number: 4,894,667
[45] Date of Patent: Jan. 16, 1990

[54] INK JET RECORDING HEAD HAVING A SURFACE INCLINED TOWARD THE NOZZLE FOR ACTING ON THE INK

[75] Inventor: Jiro Moriyama, Yokohama, Japan

[73] Assignee: Canon Kabushiki Kaisha, Tokyo, Japan

[21] Appl. No.: 9,873

[22] Filed: Feb. 2, 1987

[30] Foreign Application Priority Data

Feb. 5, 1986 [JP] Japan ................................. 61-22054

[51] Int. Cl.⁴ ........................................... G01D 15/16
[52] U.S. Cl. ................................... 346/140 R; 346/1.1
[58] Field of Search .............. 346/140 PD, 140 R, 1.1

[56] References Cited

U.S. PATENT DOCUMENTS

| | | | |
|---|---|---|---|
| 4,278,983 | 7/1981 | Halasz | 346/140 PD |
| 4,306,245 | 12/1981 | Kasagayama et al. | 346/140 PD |
| 4,308,547 | 12/1981 | Lovelady et al. | 346/140 PD |
| 4,339,762 | 7/1982 | Shirato et al. | 346/140 R |
| 4,376,945 | 3/1983 | Hara et al. | 346/140 R |
| 4,459,600 | 7/1984 | Sato et al. | 346/140 PD |
| 4,531,138 | 7/1985 | Endo et al. | 346/140 R |
| 4,536,777 | 8/1985 | Matsumoto | 346/140 R |
| 4,646,110 | 2/1987 | Ikeda et al. | 346/140 R |

FOREIGN PATENT DOCUMENTS

| | | | |
|---|---|---|---|
| 0139455 | 7/1985 | Japan | 346/140 PD |
| 0139456 | 7/1985 | Japan | 346/140 PD |
| 0198254 | 10/1985 | Japan | 346/140 PD |

*Primary Examiner*—B. A. Reynolds
*Assistant Examiner*—Huan H. Tran
*Attorney, Agent, or Firm*—Fitzpatrick, Cella, Harper & Scinto

[57] ABSTRACT

An ink jet recording head comprising an ink flow path communicating with an ink jet nozzle and an electro-mechanical converting element provided along said ink flow path, an ink acting surface on which energy generated by said electro-mechanical converting element acts the surface being inclined with respect to an ink flow direction and toward said ink jet nozzle.

12 Claims, 4 Drawing Sheets

FIG. 5
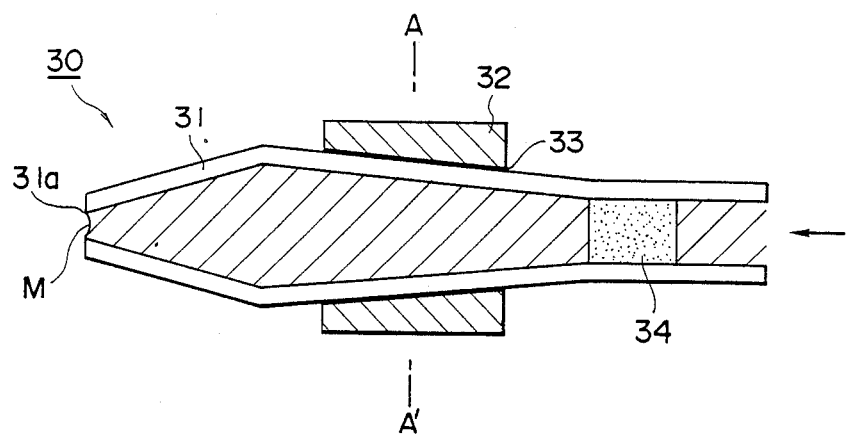
FIG. 6A    FIG. 6B
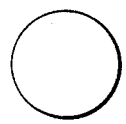   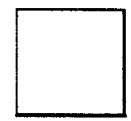
FIG. 7
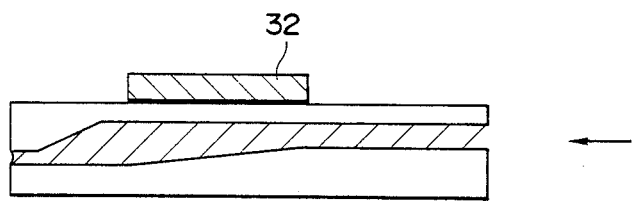

INK JET RECORDING HEAD HAVING A SURFACE INCLINED TOWARD THE NOZZLE FOR ACTING ON THE INK

BACKGROUND OF THE INVENTION

1. Field of the Invention

The present invention relates to an ink jet recording head, and more particularly to an ink jet recording head which discharges an ink droplet from an end of an ink discharge opening, such as an ink jet nozzle, by a pressure developed by an electro-mechanical transducer arranged along an ink flow path of the device.

2. Related Background Art

FIG. 1A shows a sectional view of the nozzle of the conventional recording head of the ink jet printer. The nozzle as shown in FIG. 1A is a Gould type nozzle. A nozzle body 31 is cylindrical with one end being conical and having a uniform diameter except for the conical portion. A discharge port 31a for discharging ink 35 from the nozzle body 31 as ink droplets is formed at the end of the nozzle body 31. The surface of the ink 35 exposed through the discharge port 31a forms a concave meniscus M.

A cylindrical piezoelectric element 32 which is an electro-mechanical transducing element for generating a discharging pressure for the ink droplets is fitted to an outer surface at the center of the nozzle body 31. It is integrated with the nozzle body 31 without clearance or gaps by adhesive material 33 such as epoxy resin.

A filter 34 is fitted and fixed near an open rear end of the nozzle body 31. The filter 34 blocks dirt and foreign materials in the ink 35 which flows to the left as shown by an arrow in the drawing from the rear end of the nozzle body 31 to the front end of the nozzle body, and also functions to match acoustic impedance at the front end and the rear end to a sound wave generated in the nozzle body 31 when the piezoelectric element 32 is driven.

In a recording mode, the piezoelectric element 32 receives the pulse voltage in accordance with the record data so that the piezoelectric element 32 contracts. As it contracts, a sound wave is generated and propagates in the ink 35 at a velocity of approximately 1200 m/s. FIG. 1B shows a manner of propagation. It shows a relationship between position in the nozzle body 31 and sound pressure at a time of application of the pulse voltage ($t=0$) and at a time shortly thereafter ($t=t_1$), with the center of the graph corresponding to the center of the piezoelectric element 31. Because the ink 35 is discharged by the contraction pressure of the piezoelectric element 32 and the sound wave propagates as described above, the ink droplets are discharged from the discharge port 31a.

In the nozzle 30 described above, the sound wave generated by the drive of the piezoelectric element 32 and propagated to the rear end of the nozzle body 31 is reflected by the filter 34. The meniscus M is vibrated by the reflected sound wave. This vibration impedes efforts to shorten a period of ink drop discharge, that is, to improve a frequency characteristic and increase a recording speed.

SUMMARY OF THE INVENTION

In order to resolve the above problem, in accordance with the present invention, a sectional area, perpendicular to a direction of ink flow in the ink flow path, of an area in which the electro-mechanical transducing element of the ink discharge nozzle is arranged increases as it goes toward the nozzle front end.

According to one aspect of the present invention is provided an ink jet recording head comprising ink flow path communicating with a ink jet nozzle and an electro-mechanical converting element provided along said ink flow path, an ink acting surface on which an energy generated by said electro-mechanical converting element acts being inclined with respect to an ink flow direction and toward said ink jet nozzle.

According to another aspect of the present invention is provided an ink jet recording head comprising an ink flow path communicating with an ink jet nozzle and an electro-mechanical converting element provided along said ink flow path; a sectional area, perpendicular to a direction of flow of the ink in the ink flow path, in an area in which said electro-mechanical converting element is arranged, gradually increases toward the front end of the nozzle.

These and other features and advantages of the invention will be appreciated more fully from a consideration of the following detailed description of the preferred embodiments taken in conjunction with the accompanying drawings.

BRIEF DESCRIPTION OF THE DRAWINGS

FIG. 5 shows a sectional view of a nozzle having a modified shape of piezoelectric element, FIGS. 6A and 6B show sectional shapes take along a line A—A' in FIG. 4A, and FIG. 7 shows a sectional view of a Cryonics type nozzle in accordance with the present invention.

DETAILED DESCRIPTION OF THE PREFERRED EMBODIMENTS

Figure 1A:
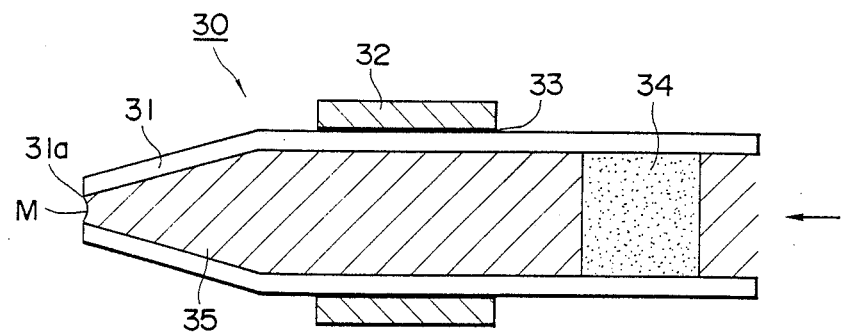
FIG. 1A shows a sectional view of a prior art nozzle.
Figure 4A:
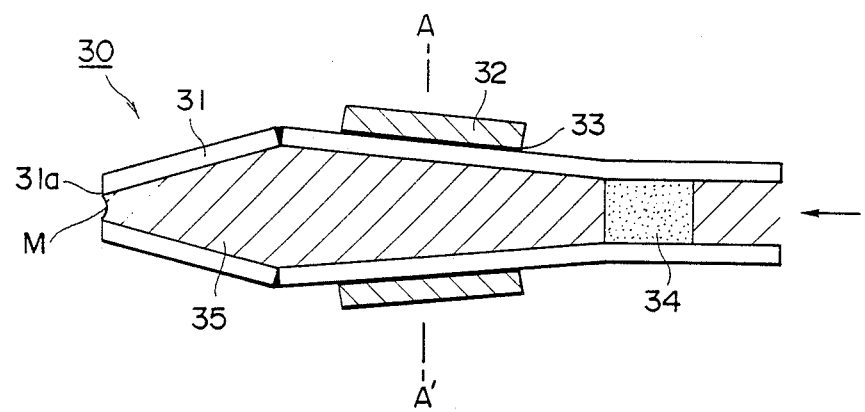
FIG. 4A shows a sectional view of a Gould type ink jet nozzle in accordance with the present invention.

FIG. 4A shows a sectional view of a Gould type nozzle 30 in accordance with the present invention. The like elements to those shown in FIG. 1A are designated by like numerals.

As shown in FIG. 4A, the nozzle body 31 is cylindrical with the front end being of cone shape, and a center area at which the piezoelectric element 32 is fitted and fixed is also of cone shape in the opposite direction to that of the front end. The rear end at which the filter 34 is fitted is of smaller diameter than the prior art nozzle. In the ink flow path in the area or portion in which the piezoelectric element 32 is provided, the sectional area in the direction of a line A—A' perpendicular to the direction of flow of the ink 35 increases as it goes toward the front end of the nozzle.

The piezoelectric element 32 is also of cone shape to correspond to the center area of the nozzle body 31 and is bonded to the outer surface of the nozzle body 31 by adhesive material 33.

The nozzle body 31 is made of glass or electroformed nickel or stainless steel. When seamless joining is required, adhesive material or thermal fusion is used, although any manufacturing process may be used.

In a recording mode, when a pulse voltage is applied to the piezoelectric element 32 and the latter contracts, the ink 35 in the nozzle body 31 receives a larger leftward force toward the front end of the nozzle body than a force in the opposite direction, because of the shape of the nozzle body 31 which expands toward the front end of the nozzle body. By those forces and the function of the sound wave generated thereby, ink droplets are discharged from the discharge port 31a at the end of the nozzle.

Figure 1B:
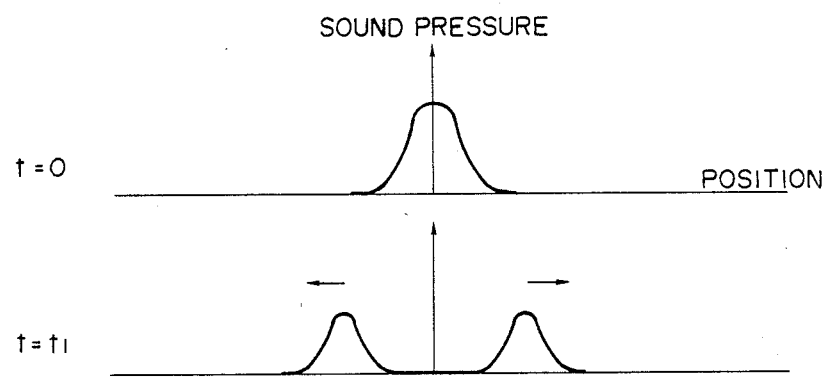
FIG. 1B shows propagation of a sound wave in the nozzle of FIG. 1A.
Figure 4B:
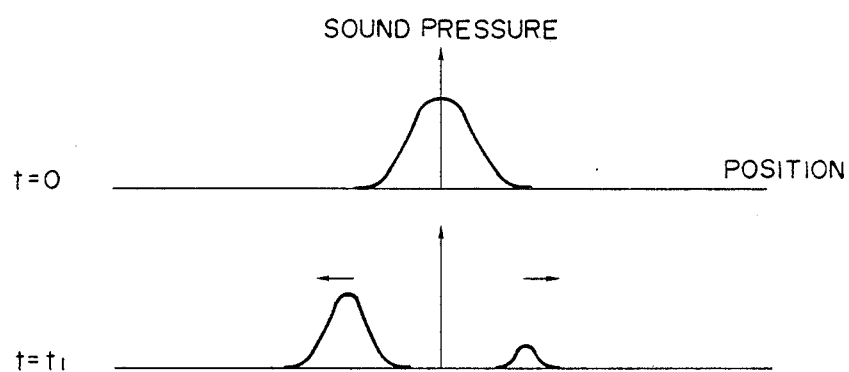
FIG. 4B illustrates propagation of a sound wave in the nozzle of FIG. 4A.

The sound wave is propagated as shown in FIG. 4B, which is similar to FIG. 1B. As shown in FIG. 4B, the sound pressure of the sound wave propagated toward the front end of the nozzle is much larger than that of the sound wave propagated toward the rear end.

In accordance with the present embodiment the sound wave reflected by the filter 34 is small, the vibration of the meniscus M after the discharge of the ink droplet is suppressed, the period of ink discharge is shortened, the frequency characteristic is improved and the recording speed is increased.

In accordance with the present embodiment, since the ratio of the force applied toward the front end of the nozzle and the component of the sound wave propagated is larger than that of the prior art nozzle, the efficiency of the ink jet energy, measured as a fraction of the energy applied to the piezoelectric element 32, is improved. Thus, the voltage applied to the piezoelectric element to discharge a given amount of ink can be lowered, or an application period can be shortened. For a given energy applied to the piezoelectric element, the amount of discharge and a discharge speed can be increased.

In the present embodiment, the piezoelectric element 32 is of cone shape in the inner surface and the outer surface. Alternatively, the outer surface may be of cylindrical shape and the inner surface may be of cone shape as shown in FIG. 5.

In the present embodiment, the nozzle body 31 is cylindrical and a section along the line A—A' of FIG. 4A is circular as shown in FIG. 6A. Alternatively, the section may be of another shape, for example, square shape as shown in FIG. 6B so long as the sectional area at the center area or portion in the direction of the line A—A' increase as it goes toward the front end of the nozzle.

The nozzle structure of the sectional area of the ink flow path is applicable to not only the Gould type nozzle as shown in FIG. 5 but also other types of nozzles as shown in FIG. 7.

Figure 2:
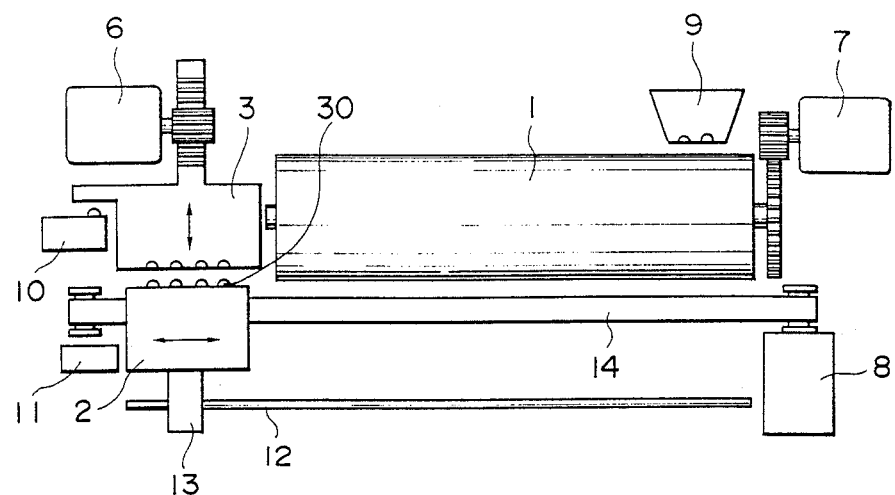
FIG. 2 shows a mechanical construction of an ink jet printer on which a recording head is mounted.
Figure 3:
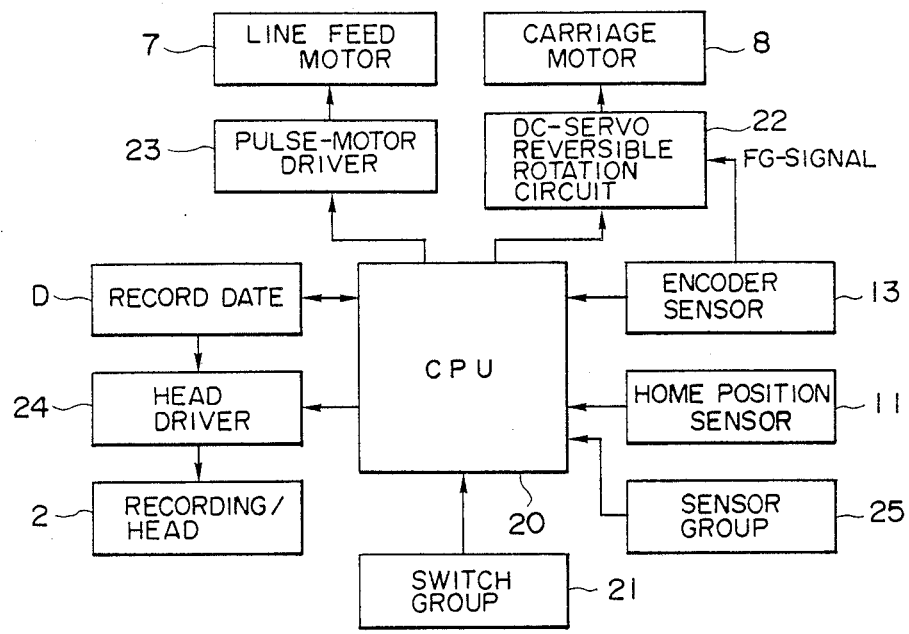
FIG. 3 shows a block diagram of a printer control unit.

A construction of an ink jet printer which records characters by the ink jet recording head according to the present invention is shown in FIG. 2.

In FIG. 2, numeral 1 denotes a platen which is driven by a line feed motor 7 which is a pulse motor, to feed a record paper, not shown. The presence or absence of the record paper is sensed by a paper sensor 9. Numeral 2 denotes an ink jet recording head having a plurality of ink jet nozzles 30, arranged on a carriage which is slidable on a guide bar (not shown), and movable along the platen 1 through a belt 14 by a carriage motor 8 which is a DC motor. In order to sense a position of the recording head 2, a linear encoder 12 and an encoder sensor 13 are provided, and a home position sensor 11 is provided to detect its presence at a home position. In order to recover from ink droplet non-discharge of the nozzles 30 of the recording head 2, an ink sucking cap 3 which is driven by an auto-cap motor 6 is provided. An operation position of the cap 3 is sensed by a cap sensor 10.

The ink jet printer thus constructed is controlled by a known CPU 20 is a control unit shown in FIG. 6. The CPU 20 carries out the following control operation in accordance with inputs from switches 21 on a console panel (not shown). It controls the drive of the carriage motor 8 through a DC-servo reversible rotation circuit 22 based on an input from the home position sensor 11, controls the drive of the line feed motor 7 through a pulse motor drive circuit 23, supplies record data D to a head driver 24 and drives the recording head 2 by the head driver 24. It also controls other mechanisms (not shown) in response to inputs from other sensors 25.

When a print switch of the switches 21 is depressed, a record operation is started. After the presence of the record paper has been checked by the paper sensor 9, the line feed motor 7 is driven by several steps, the platen 1 is rotated and the record paper is set at a record start position. Then, the carriage motor 8 is driven, the recording head 2 is reciprocally driven, and the line feed motor 7 is driven in synchronism therewith to feed the record paper line by line. The head driver 24 supplies a drive signal corresponding to the record data to the recording head 2, and the recording head 2 is driven and ink droplets are discharged from the nozzle 30 to record characters or images.

In a nozzle 30 shown in FIG. 4A, a center of a cylindrical nozzle body 31 on which a piezoelectric element 32 is fitted is of cone shape with a diameter which becomes larger toward the front end of the nozzle body 31. That is, a sectional area perpendicular to a direction of flow of the ink flow path near the piezoelectric element 32 increases as it goes toward the front end of the nozzle body. The piezoelectric element 32 is also constructed in a cone shape. When the piezoelectric element 32 is driven (contracted), the ink 35 in the nozzle body 31 receives a larger force directed to the front end of the nozzle body 31 than a force in the opposite direction, and a sound wave generated is largely propagated toward the front end of the nozzle body 31 and little propagated to the rear end as shown in FIG. 4A. Accordingly, the sound wave reflected by the filter 34 is small, the vibration of the meniscus M is suppressed and the period of ink discharge can be shortened. Further, since a ratio of the force applied toward the front end of the nozzle body and the component of sound wave propagated is larger than that of a conventional nozzle, an efficiency of an ink jet energy measured as a fraction of the energy applied to the piezoelectric element 32, is improved.

In accordance with the ink jet recording head of the present invention, the sectional area, perpendicular to the direction of flow of the ink in the ink flow path, in the area of the ink jet nozzle at which the electromechanical transducing element is arranged increases toward the front end of the nozzle. By such a simple and inexpensive construction, the frequency characteristic is improved, the recording speed is increased and the efficiency of consumed energy is improved.

I claim:

1. An ink jet recording head comprising:
   a member forming an ink flow path communicating with an opening for discharging ink therefrom; and
   an electro-mechanical converting element provided along said ink flow path at an ink acting surface inclined with respect to an ink flow direction so as to increase the sectional area of said ink flow path toward said ink discharging opening, wherein a thickness of said member at said ink acting surface is substantially constant.

2. An ink jet recording head according to claim 1, wherein the sectional shape of said ink flow path is circular.

3. An ink jet recording head according to claim 1, wherein the sectional shape of said ink flow path is rectangular.

4. An ink jet recording head according to claim 1, wherein a filter is provided in said ink flow path upstream of said electro-mechanical converting element.

5. A recording apparatus having an ink jet recording head according to claim 1.

6. An ink jet recording head comprising:
a member forming an ink flow path communicating with an opening for discharging ink therefrom; and
an electro-mechanical converting element provided along said ink flow path,
wherein the sectional area of said ink flow path, perpendicular to a direction of flow of the ink in said ink flow path, increases in the direction of flow in an area in which said electro-mechanical converting element is arranged and downstream of said area, and then decreases, and wherein a thickness of said member at said electro-mechanical converting element is substantially constant.

7. An ink jet recording head according to claim 6, wherein the sectional shape of said ink flow path is circular.

8. An ink jet recording head according to claim 6, wherein the sectional shape of said ink flow path is rectangular.

9. An ink jet recording head according to claim 6, wherein a filter is provided in said ink flow path upstream of said electro-mechanical converting element.

10. A recording apparatus having an ink jet recording head according to claim 6.

11. An ink jet recording head comprising:
a member forming an ink flow path communicating with an opening for discharging ink therefrom; and
an electro-pressure converting element provided along said ink flow path at an ink acting surface inclined with respect to an ink flow direction so as to increase the sectional area of said ink flow path toward said ink discharging opening,
wherein a thickness of said member at said ink acting surface is substantially constant.

12. An ink jet recording head comprising:
a member forming an ink flow path communicating with an opening for discharging ink therefrom; and
an electro-pressure converting element provided along said ink flow path,
wherein the sectional area of said ink flow path, perpendicular to a direction of flow of the ink in said ink flow path, increases in the direction of flow in an area in which said electro-pressure converting element is arranged and downstream of said area, and then decreases, and wherein a thickness of said member at said electro-pressure converting element is substantially constant.

* * * * *